US007660996B2

(12) United States Patent
Ittogi

(10) Patent No.: US 7,660,996 B2
(45) Date of Patent: Feb. 9, 2010

(54) ELECTRONIC APPARATUS AND UNIT UTILIZED IN ELECTRONIC SYSTEM

(75) Inventor: Hirotaka Ittogi, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 522 days.

(21) Appl. No.: 11/556,809

(22) Filed: Nov. 6, 2006

(65) Prior Publication Data

US 2007/0121709 A1 May 31, 2007

(30) Foreign Application Priority Data

Nov. 29, 2005 (JP) ............................ 2005-344442

(51) Int. Cl.
*G06F 21/00* (2006.01)
*H04L 27/00* (2006.01)

(52) U.S. Cl. ...................................... 713/182; 375/259

(58) Field of Classification Search ................ 375/219, 375/259, 295; 713/182
See application file for complete search history.

(56) References Cited

U.S. PATENT DOCUMENTS

2005/0207580 A1* 9/2005 Milliken et al. ............ 380/256
2005/0235145 A1* 10/2005 Slick et al. .................. 713/165
2005/0254656 A1* 11/2005 Rose et al. .................. 380/277
2007/0101120 A1* 5/2007 Patel et al. .................. 713/151

FOREIGN PATENT DOCUMENTS

JP 2003-307982 10/2003

* cited by examiner

*Primary Examiner*—David B Lugo
(74) *Attorney, Agent, or Firm*—Fitzpatrick, Cella, Harper & Scinto

(57) ABSTRACT

A printer apparatus generates a fixed-length packet by appending a termination identifier for representing a termination point of sub-data. The printer apparatus transmits the packet to a unit. Upon receiving the packet, the unit detects burst error based upon the termination identifier.

9 Claims, 12 Drawing Sheets

ELECTRONIC APPARATUS AND UNIT UTILIZED IN ELECTRONIC SYSTEM

BACKGROUND OF THE INVENTION

1. Field of the Invention

The present invention relates to an electronic system that includes an electronic apparatus and a unit removably attached to the electronic apparatus.

2. Description of the Related Art

Generally, in an electronic apparatus such as a printer, components needing periodic replacement and devices for expanding or changing functions are required to be replaced on a per-unit basis. For example, in an electrophotographic printer, a fixing unit is one example of such a unit. Other examples of such units are an optional feeder and an optional paper discharge unit.

Imitations of such units have been appearing on the market with increasing frequency in recent years. If such an imitation product is attached to a printer, there is the danger that the printer will malfunction or that the printer body itself will be damaged. In particular, with regard to a unit such as a fixing unit requiring a very high reliability, urging the user to exercise caution is vital in the event that a genuine product has not been attached.

In accordance with the specification of Japanese Patent Application Laid-Open No. 2003-307982, an identification apparatus encrypts a random number and transmits the encrypted signal to an accessory. The accessory decrypts the encrypted random number, appends an ID to the decrypted random number, re-encrypts the random number and transmits the resultant random number to the identification apparatus. The identification apparatus decrypts the received random number and determines whether the decrypted random number matches the original random number. In this way it can be determined whether the accessory is a genuine product or not.

However, Japanese Patent Application Laid-Open No. 2003-307982 is indifferent with regard to data error and clock synchronization error. For example, data-shift error can occur with clock synchronization error as the cause (clock synchronization error is a phenomenon in which data is shifted in its entirety because one bit of data is missed). Data-shift error is undesirable because it brings about burst error. Data-shift error can arise especially in cases where a device on the receiving side is supplied with a clock externally.

In general, authentication failure occurs owing to mismatch of a key used in encryption. Even if key match is achieved, however, authentication will fail if data error occurs during communication. The reason for this is that the data before encryption and the data after decryption differ. As a result, despite the fact that a genuine unit has been attached, the decision rendered is that the unit is not genuine. This is undesirable from the standpoint of usability.

In accordance with the present invention, data-shift error and burst error that occur owing to clock synchronization error can be sensed in ideal fashion using a termination identifier. Accordingly, it is possible to distinguish between a genuine unit and a unit that is not genuine.

SUMMARY OF THE INVENTION

The present invention is well-suited for application to an electronic system that includes an electronic apparatus and a unit removably attached to the electronic apparatus.

According to the present invention, the electronic apparatus comprises, e.g., a dividing part, a generating part, a first transmitting part, a first receiving part, and an authenticating part. The dividing part divides data, which is to be transmitted, into fixed-length sub-data. The generating part generates a fixed-length packet by appending a termination identifier, which is for representing a termination point of the sub-data, to the sub-data. The first transmitting part transmits the generated packet to a unit. The first receiving part receives sub-data for authentication from the unit. The authenticating part authenticates the unit based upon the received sub-data and the sub-data that was included in the packet and transmitted.

The unit includes, e.g., a second receiving part, a detecting part, a converting part, and a second transmitting part. The second receiving part receives the packet. The detecting part executes a first data error detection based upon the termination identifier included in the received packet. If data error has not been detected by the detecting part, the converting part converts sub-data, which has been extracted from the received packet, to sub-data for authenticating the unit. If data error has not been detected, then the second transmitting part transmits sub-data for authenticating the unit to the electronic apparatus. Further, if data error has been detected, the second transmitting part sends the electronic apparatus data for notifying of the fact that an error has occurred.

Further features of the present invention will become apparent from the following description of exemplary embodiments (with reference to the attached drawings).

DESCRIPTION OF THE EMBODIMENTS

Embodiments of the present invention will be illustrated below. It goes without saying that the individual embodiments described below will be useful in order to comprehend various concepts such as higher-order, intermediate-order, and lower-order concepts of the present invention. Further, the technical scope of the present invention is determined by the scope of the claims and is not limited by the individual embodiments set forth below.

First Embodiment

<Overview of Electronic System>

Figure 1:
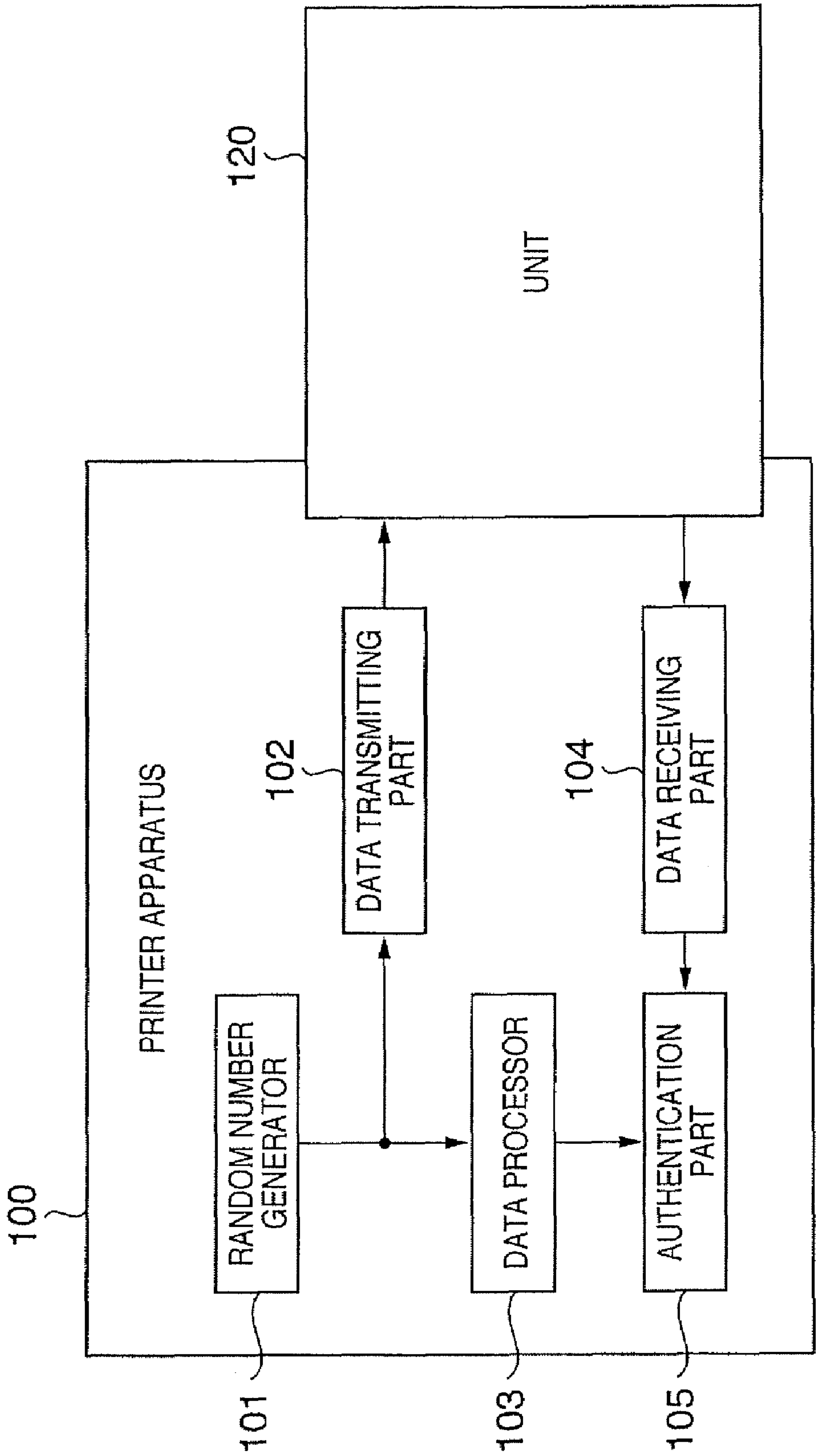
FIG. 1 is a diagram illustrating an exemplary electronic system according to an embodiment of the present invention.

FIG. 1 is a diagram illustrating an exemplary electronic system according to an embodiment of the present invention. Here a printer apparatus 100 is employed as an example of an electronic apparatus. Further, a unit 120 is a fixing unit or other removable unit (an optional unit such as an optional feeder). It should be noted that the present invention is not limited to a printer and is ideally applicable to any electronic apparatus to which a unit is removably attached. In this specification, the term "part" may be, for example, called as element, module, device, circuit, component and/or unit, and the part may be realized using software and/or hardware.

A random number generator 101 is a circuit for generating a random number. A data transmitting part 102 applies prescribed processing (e.g., redundancy processing, etc.) to a random number that has been input from the random number generator 101 and then transmits the results to the unit 120. A data processor 103 applies encryption to the random number that has entered from the random number generator 101. That is, the data processor 103 has an encryption part. A data receiving part 104 receives data that has been transmitted from the unit 120 and subjects the received data to prescribed processing (e.g., error detection processing, etc.). An authentication part 105 executes authentication processing based upon data that has entered from the data processor 103 and data that has entered from the data receiving part 104.

Figure 2:
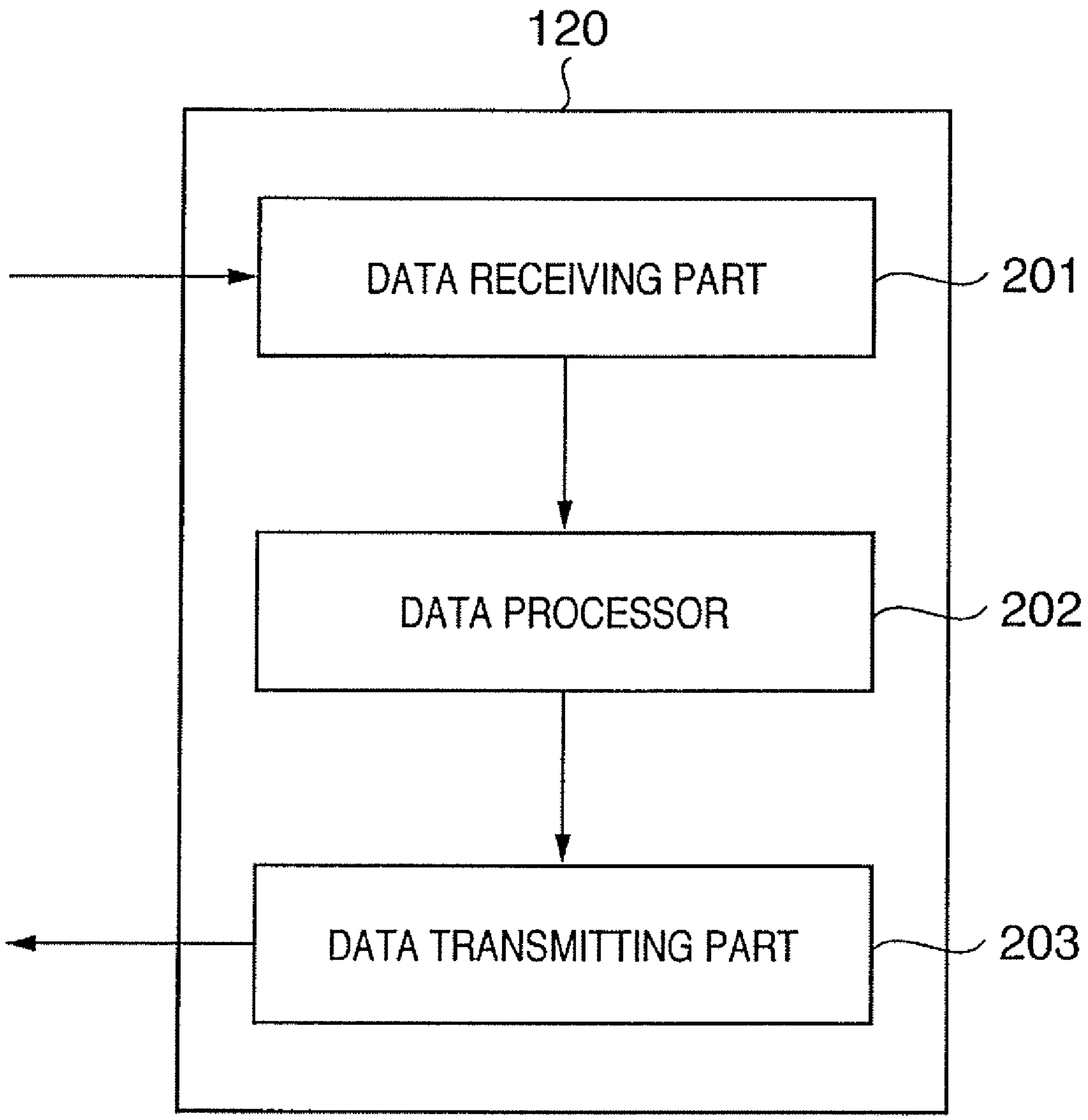
FIG. 2 is a block diagram illustrating an exemplary unit according to the embodiment.

FIG. 2 is a block diagram illustrating an exemplary unit according to this embodiment. A data receiving part 201 receives data that has been transmitted from the printer apparatus 100 and subjects the received data to prescribed processing (e.g., error detection processing, etc.). A data processor 202 applies prescribed processing (e.g., encryption, etc.) to data that has entered from the data receiving part 201. In this embodiment, it is assumed that the data processor 202 executes encryption processing using key data identical with key data used by the data processor 103. That is, the data processor 202 has an encryption part identical with that of the data processor 103. The data processor 202 may function as a data converting part which, if data error has not been detected, converts sub-data extracted from a received packet to sub-data for authenticating the unit. Further, the data processor 202 may function as a creating part which, if a data error has been detected, creates data for giving notification of the fact that an error has occurred. A data transmitting part 203 applies prescribed processing (e.g., redundancy processing, etc.) to data that has entered from the data processor 202 and transmits the resultant data to the printer apparatus 100. For example, if data error has not been detected, the data transmitting part 203 transmits sub-data for authentication to the electronic apparatus. Further, the data transmitting part 203 may function as a second transmitting part which, if data error has been detected, on the other hand, sends the electronic apparatus data for notifying of the fact that an error has occurred.

Figure 3:
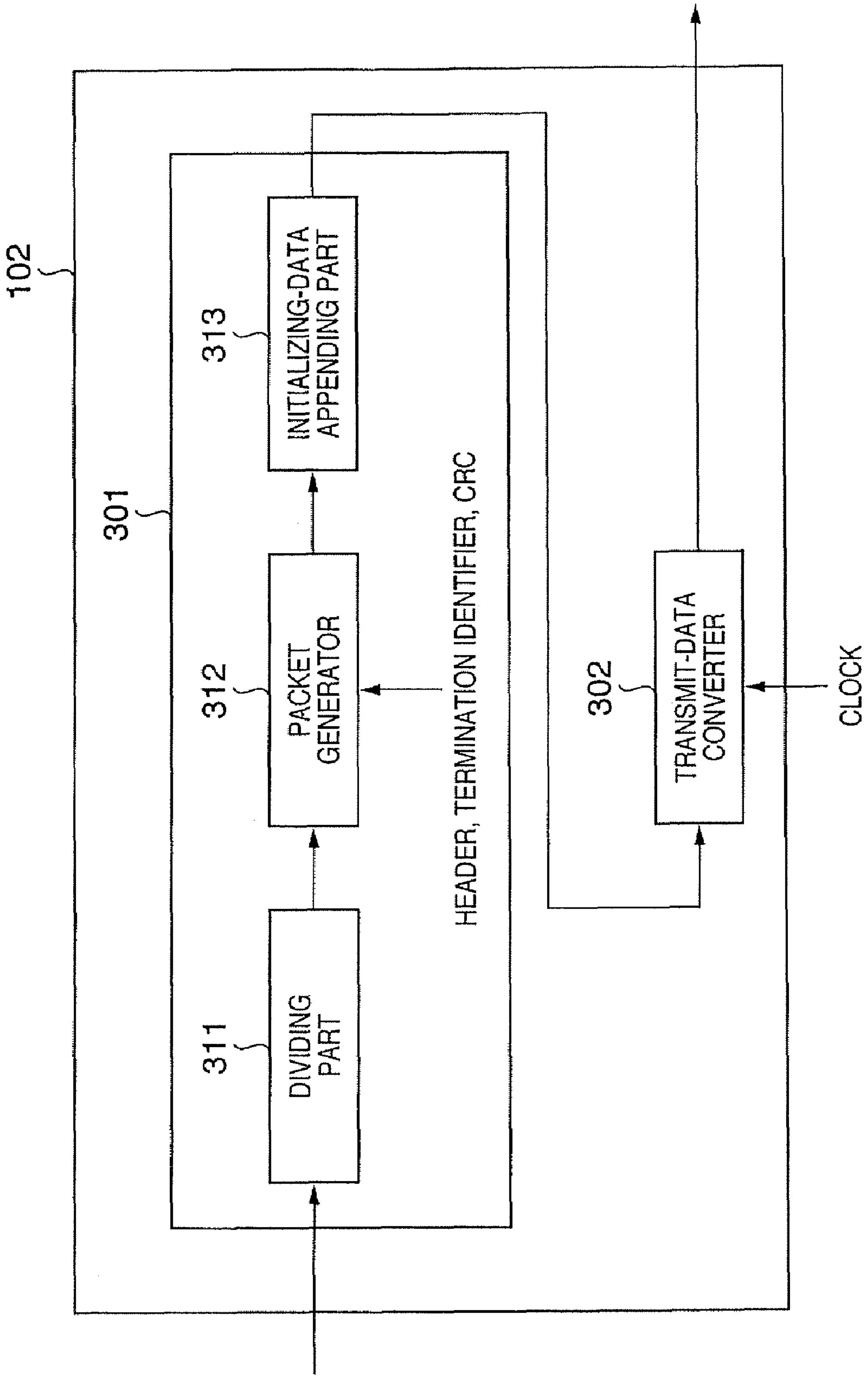
FIG. 3 is a block diagram illustrating a data transmitting part on the side of a printer apparatus according to this embodiment.

FIG. 3 is a block diagram illustrating a data transmitting part provided in a printer apparatus according to this embodiment. A redundancy appending part 301 appends redundancy data to entered data. A transmit-data converter 302 unifies and outputs the entered data and a clock. The redundancy appending part 301 includes a dividing part 311, a packet generator 312, and an initializing-data appending part 313. The dividing part 311 functions as a dividing part for dividing data, which is to be transmitted, into fixed-length sub-data. The packet generator 312 appends a termination identifier, which is for representing the termination point of the sub-data, to the sub-data, thereby generating a fixed-length packet. The initializing-data appending part 313 appends initializing data, which is for initializing a register that is holding received data. The register is provided in the data receiving part 201. It should be noted that the transmit-data converter 302 transmits a packet together with a signal for supplying the unit with an operating clock. Further, the transmit-data converter 302 also functions as a clock supplying part for supplying the unit with an operating clock during the time between processing for transmitting data from the electronic apparatus to the unit and processing for transmitting data from the unit to the electronic apparatus.

Figure 4:
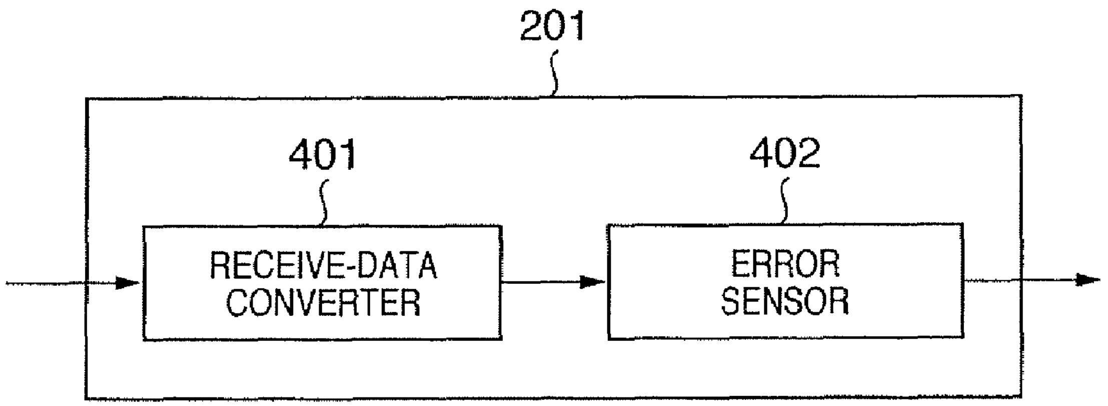
FIG. 4 is a block diagram of data reception on the unit side according to this embodiment.

FIG. 4 is a block diagram of data reception on the unit side according to this embodiment. A receive-data converter 401 separates received data into a data signal (data), a clock signal (clock), and power (VCC). An error sensor 402 senses error in entered data.

Figure 5:
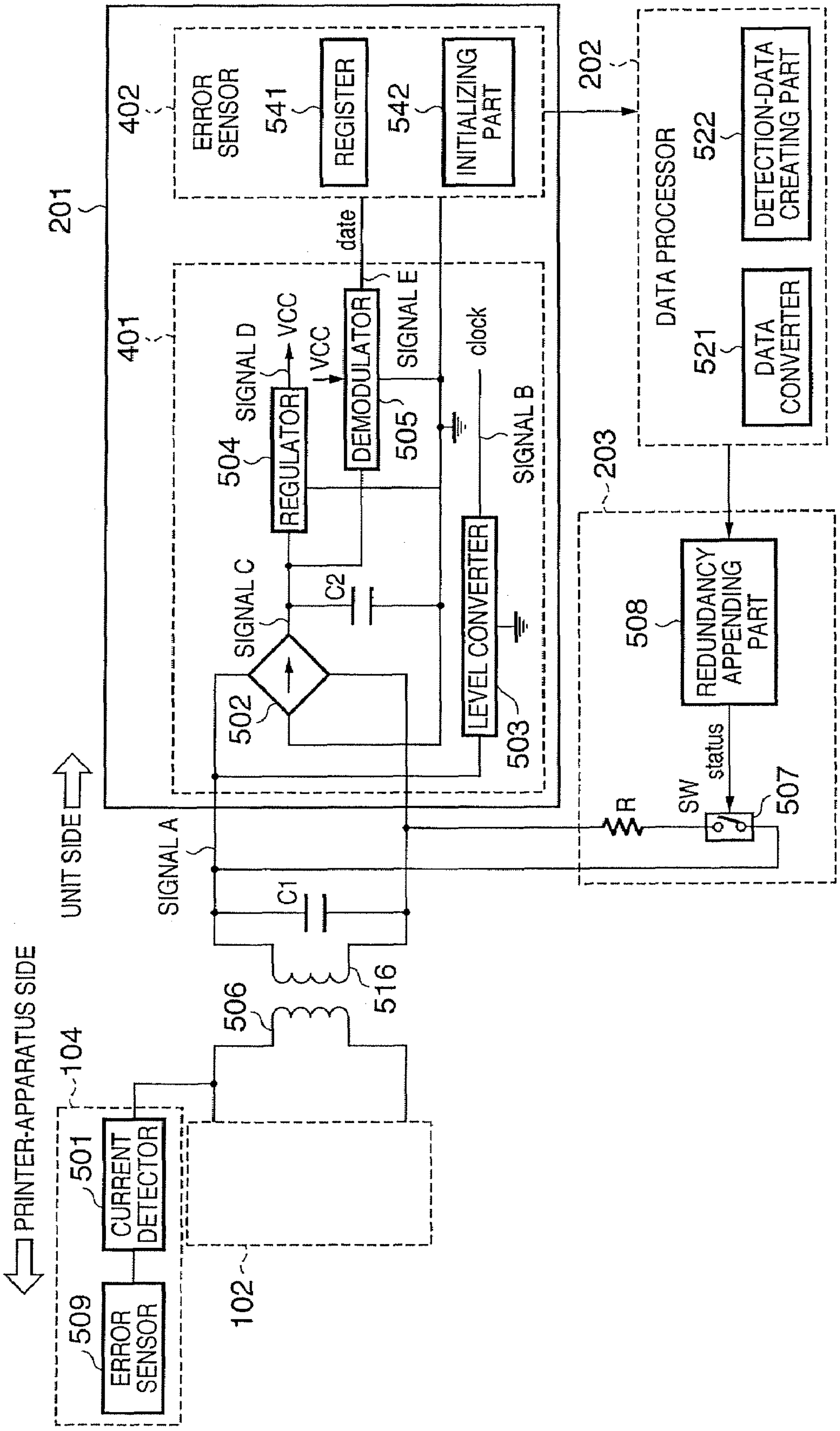
FIG. 5 is a diagram useful in describing in greater detail an exemplary electronic system according to this embodiment.
Figure 6:
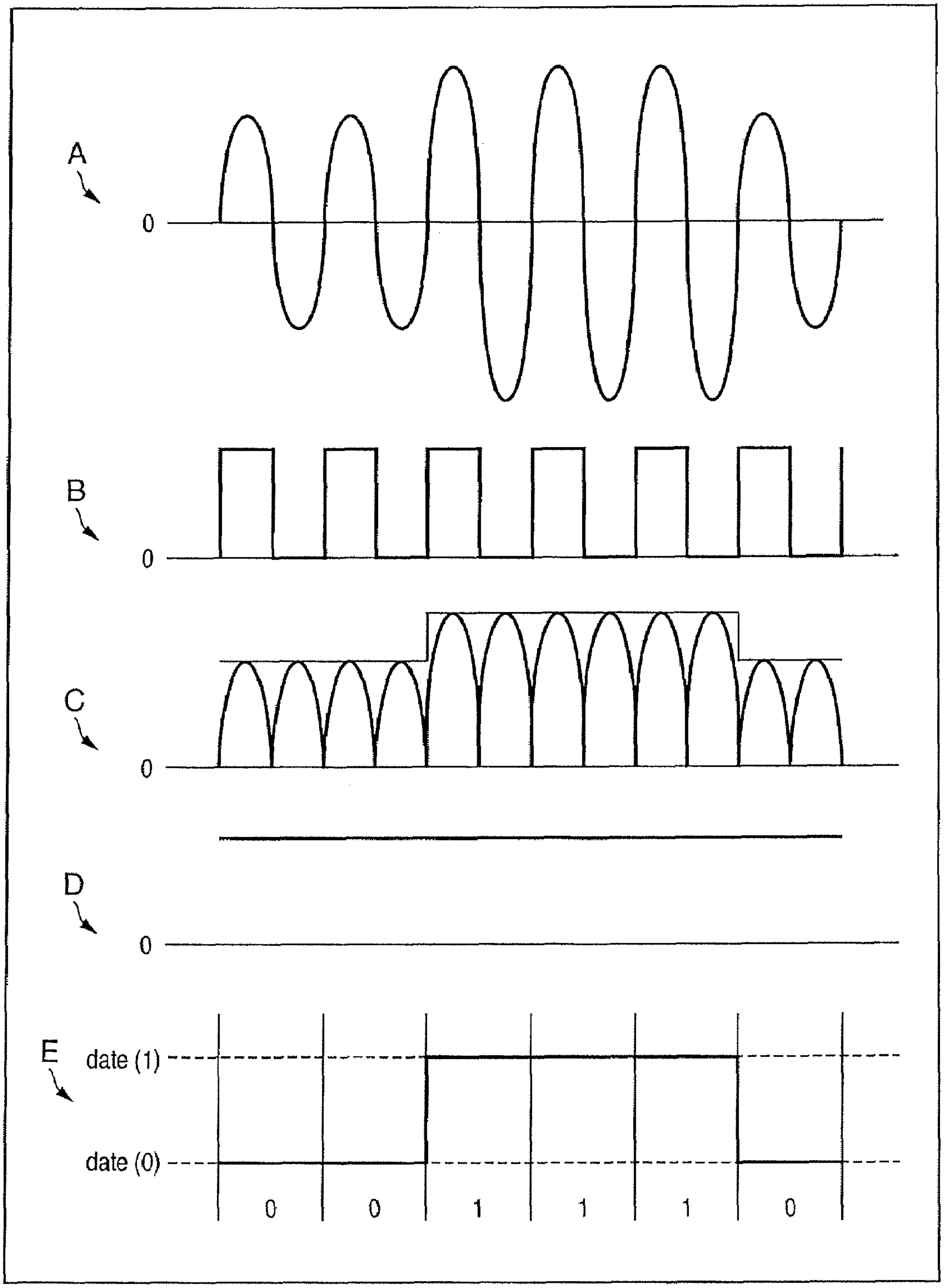
FIG. 6 is a diagram illustrating an example of signal waveforms at various portions of a data receiving part.

FIG. 5 is a diagram useful in describing in greater detail an exemplary electronic system according to this embodiment. In this example, it is assumed that the printer apparatus 100 and unit 120 communicate wirelessly (i.e., communicate without contact between them). FIG. 6 is a diagram illustrating an example of waveforms at various portions in the data receiving part 201. Signals A to E in FIG. 6 correspond to signals A to E, respectively, in FIG. 5.

The data receiving part 104 of the printer apparatus 100 has a loop antenna 506 for receiving a signal that has been transmitted from the unit 120. The loop antenna 506 is used also when the data transmitting part 102 transmits data. A current detector 501 measures a current value that depends upon the receive signal. An error sensor 509 executes error detection processing similar to that of the error sensor 402.

A loop antenna 516 receives a signal that has been transmitted from the opposing loop antenna 506 and transmits a signal from the data transmitting part 203. A full-wave rectification circuit 502 full-wave rectifies a received signal A and outputs the full-wave rectified signal as a signal C. A level converter 503 converts the level of the entered signal A and outputs the converted signal as a signal B (a clock signal). A regulator 504 converts the input signal C to a signal D. That is, the regulator 504 supplies a stable power-supply voltage to the error sensor 402, data processor 202, and data transmitting part 203. A demodulator 505 is a circuit for demodulating the original data (data) based upon a peak difference in the input signal C. The demodulated data is input to the error sensor 402. The latter has, e.g., a register 541 and an initializing part 542. The register 541 is a memory circuit for holding received data. The initializing part 542 functions as an initializing part for initializing the register 541 when an error has been detected in a signal for supplying the operating clock. The data processor 202 includes, e.g., a data converter 521 and a detection-data creating part 522. The data converter 521 functions as a data converting part which, if a data error has not been detected, converts sub-data, which has been read from a received packet, to sub-data for authenticating the unit. By way of example, the data converter 521 may function as an encrypting part for encrypting a read random number by applying a specific key thereto. If an error is detected by the error sensor 402, the detection-data creating part 522 creates error-detection data for notifying of the fact that an error has occurred. The error-detection data is appended to a packet rather than to extracted sub-data. It should be noted that the error-detection data preferably is data that is clearly distinguishable from the random number used as sub-data.

The data transmitting part 203 of the unit 120 includes a switching element 507. The switching element 507 turns a switch on and off in accordance with the input data (status). A redundancy appending part 508 executes processing similar to that of the redundancy appending part 301 in printer apparatus 100. That is, the redundancy appending part 508 appends redundancy data for error detection to data that has been output from the data processor 202.

It should be noted that VCC in FIG. 5 represents power-supply voltage, "data" indicates the demodulated signal from the demodulator 505, and "clock" denotes the clock signal used as the operating clock of the unit.

<Genuine-Unit Authentication Processing>

The printer apparatus 100 authenticates whether the attached unit 120 is a genuine unit or not. If the unit is not genuine, then the printer apparatus 100 outputs a message in order to alert the user, by way of example. This makes it possible to reduce instances where the printer apparatus 100 malfunctions due to use of a unit that is not genuine. This authentication processing will be described below.

Figure 7:
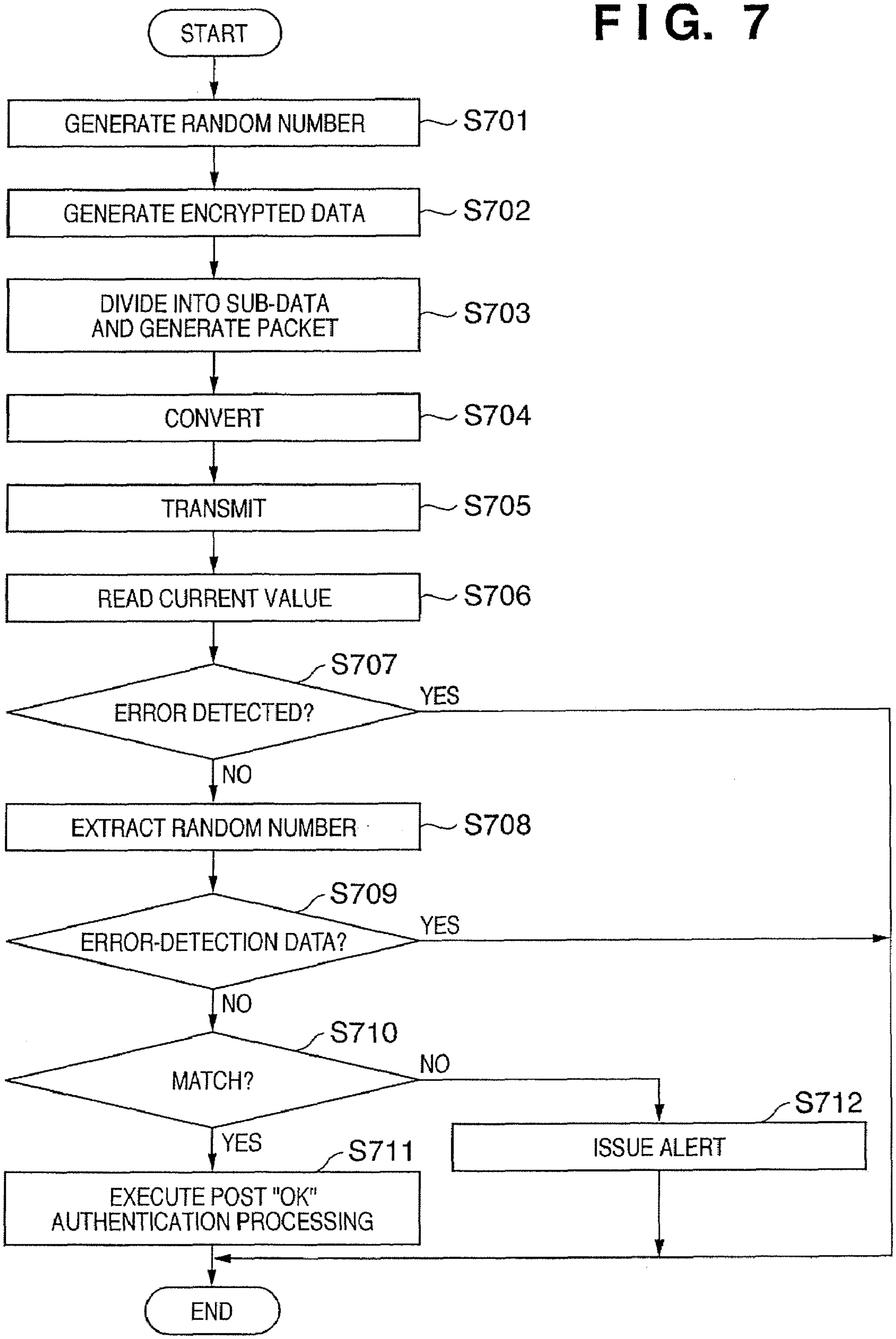
FIG. 7 is a flowchart illustrating receive processing in a printer apparatus according to the embodiment.

FIG. 7 is a flowchart illustrating receive processing executed by the printer apparatus according to the embodiment. When the unit 120 is attached to the printer apparatus 100, the random number generator 101 generates a random number at step S701. The random number is supplied to the data processor 103 and to the redundancy appending part 301 in the data transmitting part 102.

The data processor 103 generates encrypted data at step S702 by applying a specific key to the random number applied thereto. It should be noted that if the key used in the data processor 202 of unit 120 matches the key of the data processor 103, this means that the unit 120 is a genuine product. The encrypted data is input to the authentication part 105. The redundancy appending part 301 divides the entered random number into sub-data and generates a packet at step S703.

Figure 8:
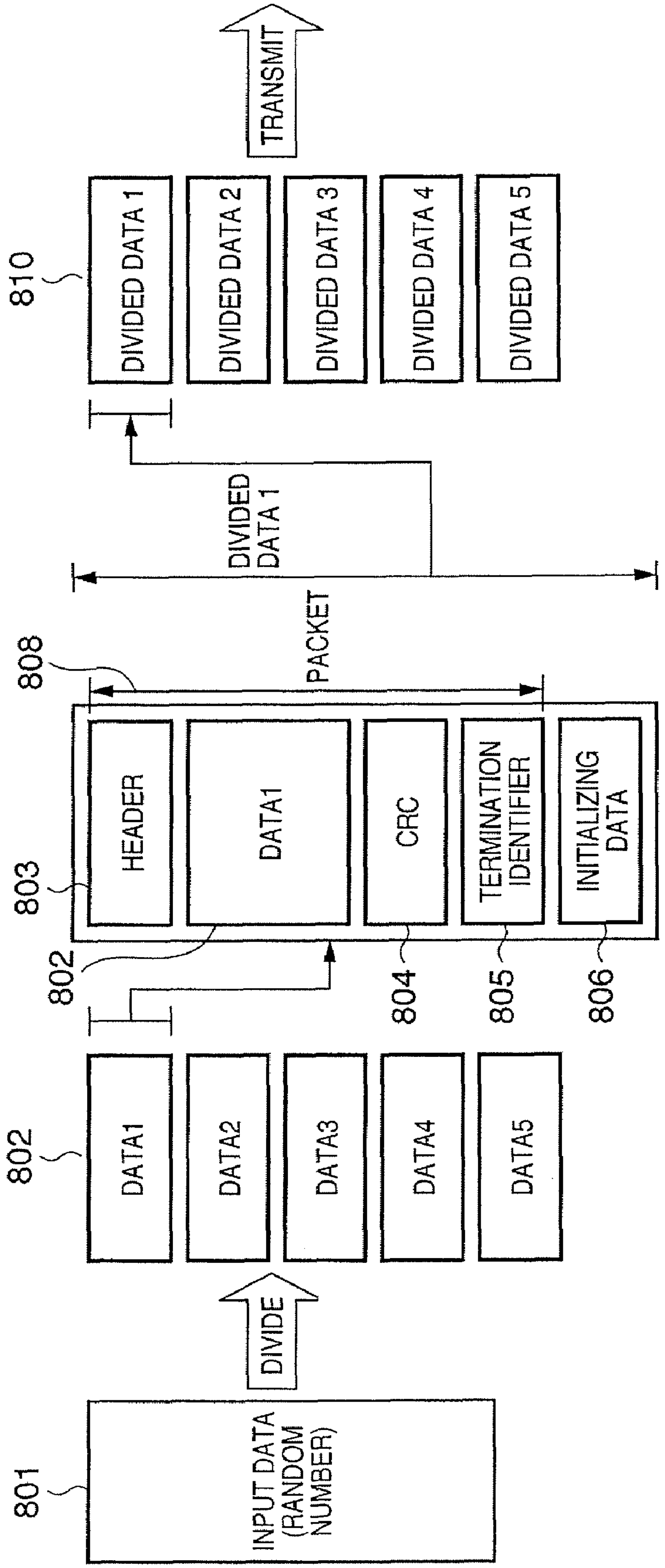
FIG. 8 is a diagram illustrating the concept of packet generation and transmission according to this embodiment.

FIG. 8 is a diagram illustrating the concept of packet generation and transmission according to this embodiment. The redundancy appending part 301 divides input data (a random number) 801 into fixed-length sub-data 802. Next, the redundancy appending part 301 appends a header 803, CRC bit 804, termination identifier 805, and initializing data 806 to each item of sub-data 802. The header 803 is a bit string representing the beginning of data. The CRC bit 804 is a check bit of a cyclic redundancy check code for detecting random error in data. It should be noted that the CRC is one example and that another random error detection code may be employed. The termination identifier 805 is a bit string that is useful in specifying the termination point of the sub-data 802. This makes it possible to detect burst error in data ascribable to clock synchronization error.

The initializing data 806 is data for initializing the register holding the received data. The initializing data 806 comprises a bit string of all "0"s or all "1"s. In FIG. 8, the items from the header 803 to the termination identifier 805 construct a packet 808. In terms of size, the packet 808 is of fixed length. Further, the divided data consists of the packet 808 and the initializing data 806. It should be noted that the divided data 810 generated is input to the transmit-data converter 302.

At step S704, the transmit-data converter 302 converts the input divided data 810 to the signal A (FIG. 6) the amplitude of which differs depending upon the "0", "1" logic of a bit. In accordance with the example of FIG. 6, a comparatively low amplitude represents "0" while a comparatively high amplitude represents "1". According to this rule, the signal is represents 001110. The data transmitting part 102 transmits the signal A from the loop antenna 506 at step S705.

Figure 9:
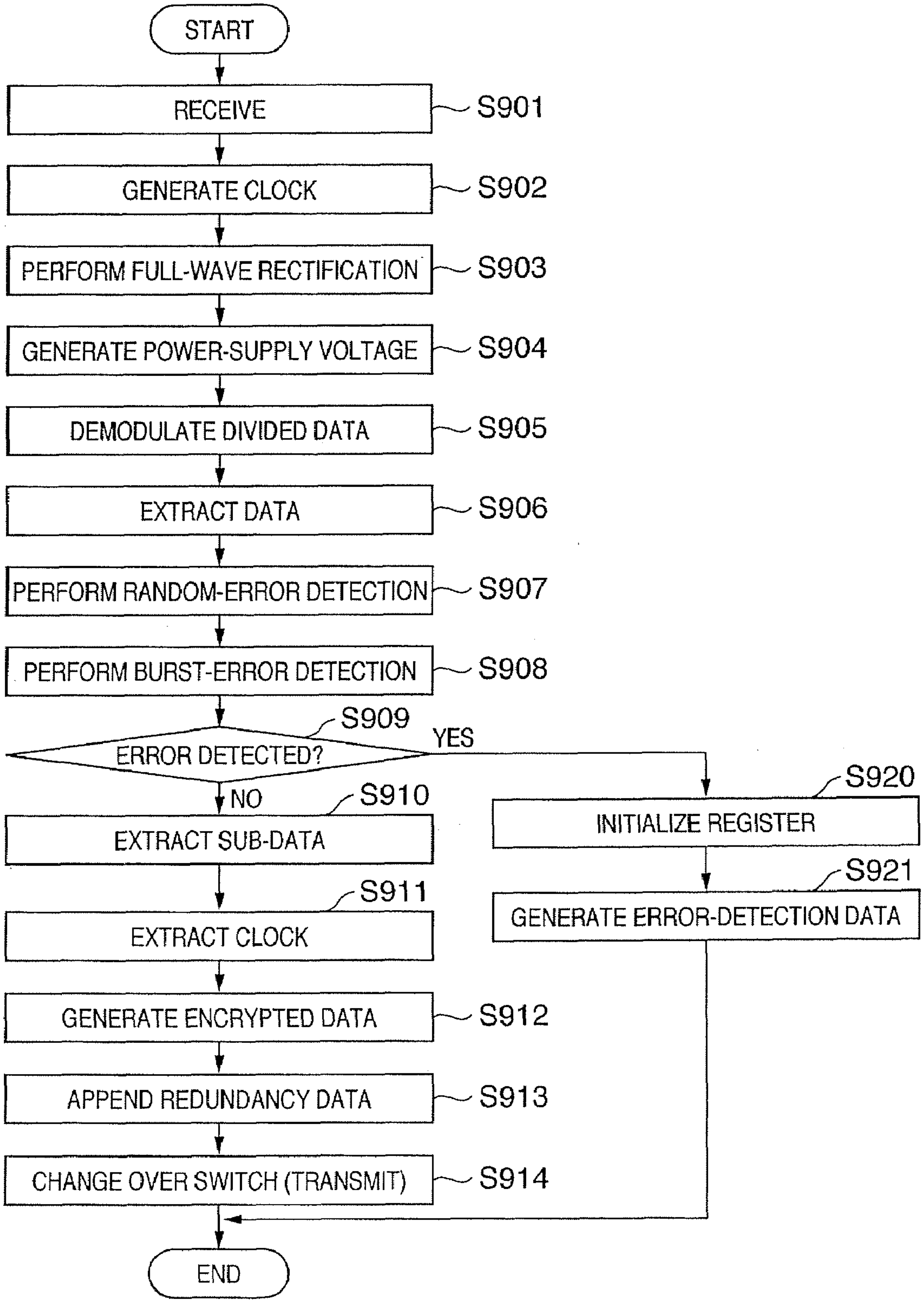
FIG. 9 is a flowchart illustrating receive processing in a unit according to this embodiment.

FIG. 9 is a flowchart illustrating receive processing executed by the unit according to this embodiment. The data receiving part 201 receives a wireless signal from the printer apparatus 100 using the loop antenna 516 at step S901. The signal A received is input to the full-wave rectification circuit 502 and level converter 503.

At step S902, the level converter 503 converts the level of the input signal and generates the signal B (clock) for use as the operating clock. At step S903, the full-wave rectification circuit 502 generates the signal C by full-wave rectifying the input signal. The signal C is input to the regulator 504 and demodulator 505.

The regulator 504 to which the signal C has been input converts the level of signal C to a fixed level and generates the signal D (VCC), which is a stabilized power-supply voltage, at step S904. The demodulator 505 demodulates the original divided data 810 (referred to as "data" below) at step S905 based upon the peaks of signal C. The signal E shown in FIG. 6 represents the demodulated signal (data). It should be noted that VCC and clock are used as a power-supply voltage and operating clock, respectively, shared with the unit 120. Further, data is input to the error sensor 402. The error sensor 402 to which data has been input executes data extraction processing at step S906.

Figure 10:
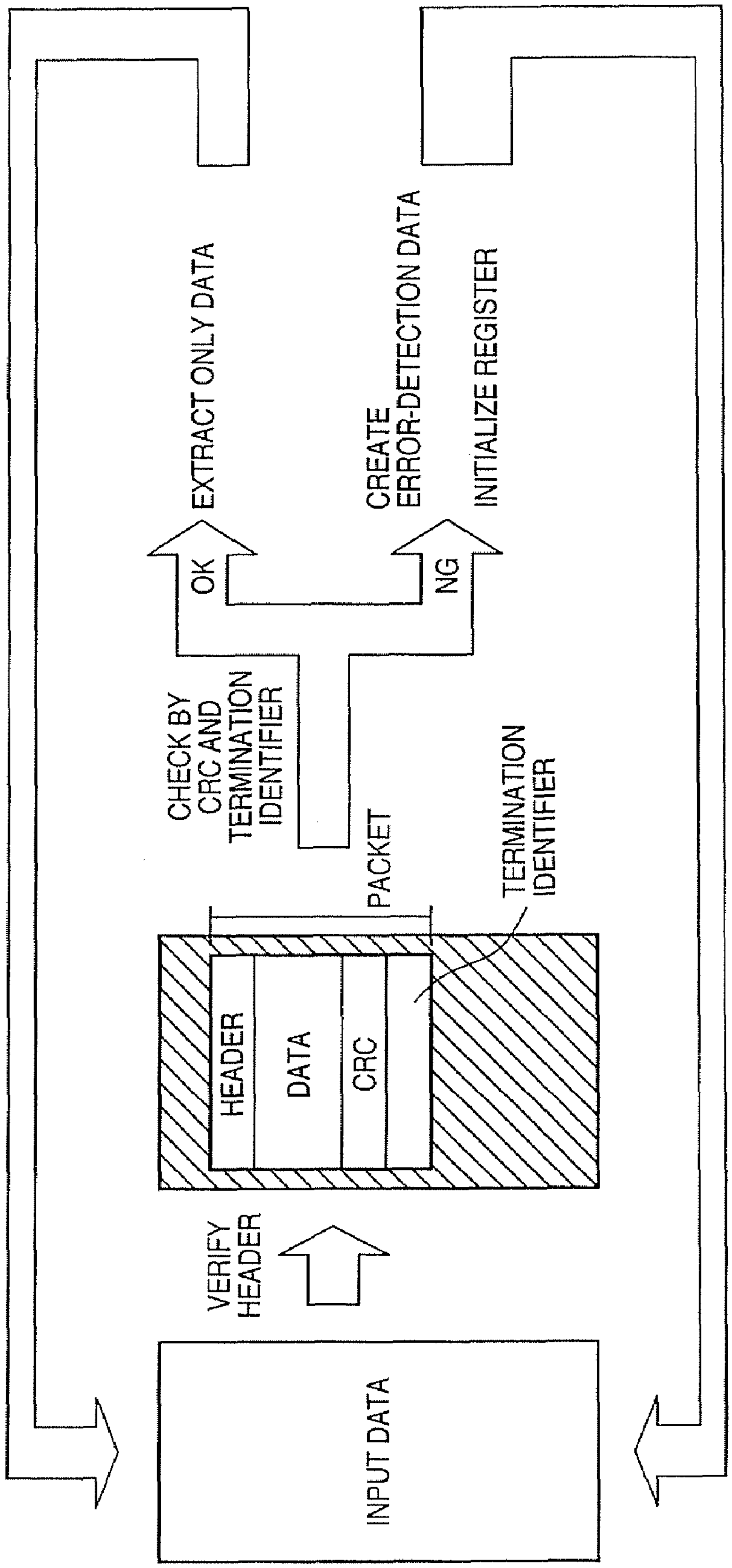
FIG. 10 is a diagram illustrating the concept of data extraction processing in an error sensing part.

FIG. 10 is a diagram illustrating the concept of data extraction processing in the error sensing part 402. The error sensor 402 checks the header 803 representing the beginning of the divided data 810.

The error sensor 402 subjects the sub-data 802 to error detection using the CRC bit 804 at step S907. Detection of random error is carried out as a result.

The error sensor 402 performs burst-error detection using the termination identifier 805 at step S908. First, the error sensor 402 extracts the termination identifier 805 from data. The packet 808 is a fixed-length packet, as mentioned above. Accordingly, the error sensor 402 is capable of specifying and extracting the position of the termination identifier 805 using the header 803 as a reference. If burst error due to clock synchronization error has occurred, the position of the termination identifier 805 will shift. Accordingly, the error sensor 402 is capable of detecting burst error based upon whether or not the position has shifted.

The error sensor 402 determines at step S909 whether at least one of random error and burst error has been detected. If an error has been detected, then control proceeds to step S920. Here the initializing part 542 of the error sensor 402 initializes the register 541 based upon the initializing data 806. Control then proceeds to step S921. Here, the detection-data creating part 522 is notified by the error sensor 402 of detection of the error and creates error-detection data for giving notification of the fact that an error has occurred. The error-detection data is input to the redundancy appending part 508 of the data transmitting part 203.

If neither error has been detected, then control proceeds to step S910 and the error sensor 402 extracts only the portion that is the sub-data 802. Further, at step S911, the error sensor 402 uses the clock signal, which has been extracted from the initializing data 806, as the operating clock. The series of processing described above is executed with regard to all of the divided data.

At step S912, the data converter 521 of the data processor 202 converts the plurality of items of extracted sub-data 802 to sub-data that is for authenticating the unit. For example, the data converter 521 reconstructs the original random-number data 801 from the plurality of items of sub-data 802 and further generates encrypted data. The encrypted data generated is input to the redundancy appending part 508 of the data transmitting part 203. The redundancy appending part 508 applies redundancy processing to the encrypted data at step S913. This processing is similar to that executed by the redundancy appending part 301. The data thus created is adopted as "status".

At step S914, the switching element 507 switches between on and off in accordance with status (e.g., 0, 1). This switching processing corresponds to processing for transmitting data. That is, in response to the switching element 507 being turned on and off, the impedance of the unit 120 as seen from the side of the printer apparatus 100 varies. Accordingly, the amount of current that flows into the current detector 501 of the data receiving part 104 changes.

Referring again FIG. 7, at step S706, the current detector 501 reads 0, 1 depending upon the amount of current that flows. The read data is input to the error sensor 509. The latter executes error detection processing at step S707. This processing is similar to the processing executed by the error sensor 402. If an error is detected, authentication of the unit is terminated. If an error is not detected, on the other hand, then the error sensor 509 extracts the random-number data 801 and inputs it to the authentication part 105 at step S708.

The authentication part 105 determines whether the data that has entered from the error sensor 509 is error-detection data at step S709. If the data is error-detection data, the authentication part 105 terminates authentication of the unit. If the data is not error-detection data, on the other hand, then control proceeds to step S710.

The authentication part 105 compares the two entered items of data at step S710. If the two items of data match, then the unit 120 is recognized as a genuine unit and control proceeds to step S711. Here the authentication part 105 deems that the unit is a genuine unit and executes processing to follow up authentication that the unit is genuine. Processing to follow up authentication that the unit is genuine is processing for reading prescribed information from the genuine unit, by way of example. If the two items of data do not match, on the other hand, then control proceeds to step S712, where the authentication part 105 executes processing to alert the user to the fact that the unit is not genuine.

In accordance with this embodiment, as described above, the printer apparatus 100 generates a fixed-length packet by adding on the termination identifier 805 in order to indicate the termination point of the sub-data 802. Upon receiving this packet, the unit 120 is capable of detecting burst errors by the termination identifier 805. As a result, genuine-unit authentication error that is based upon burst error can be suppressed.

Further, redundancy data for detecting random error such as bit error may be appended to a packet. This will make it possible to suppress genuine-unit authentication error that is ascribable to random error.

Further, the electronic apparatus may transmit the packet together with a signal (the initializing data 806) that is for supplying the operating clock to the unit 120. In this case, the unit 120 can enjoy the advantage of not requiring a power supply such as a battery. It should be noted that the electronic apparatus may supply the operating clock to the unit in the time period between processing for transmitting data from the electronic apparatus to the unit 120 and processing for transmitting data from the unit 120 to the electronic apparatus. This makes it possible operate the unit 120 continuously.

Further, the unit 120 may initialize the register when an error has been detected in the signal that is for supplying the operating clock. That is, when an error has been detected in the initializing data 806, etc., there is the possibility that a burst error is occurring. Accordingly, it is desirable that the data being held in the register be discarded and that a data re-transmission request be issued.

Second Embodiment

Figure 11:
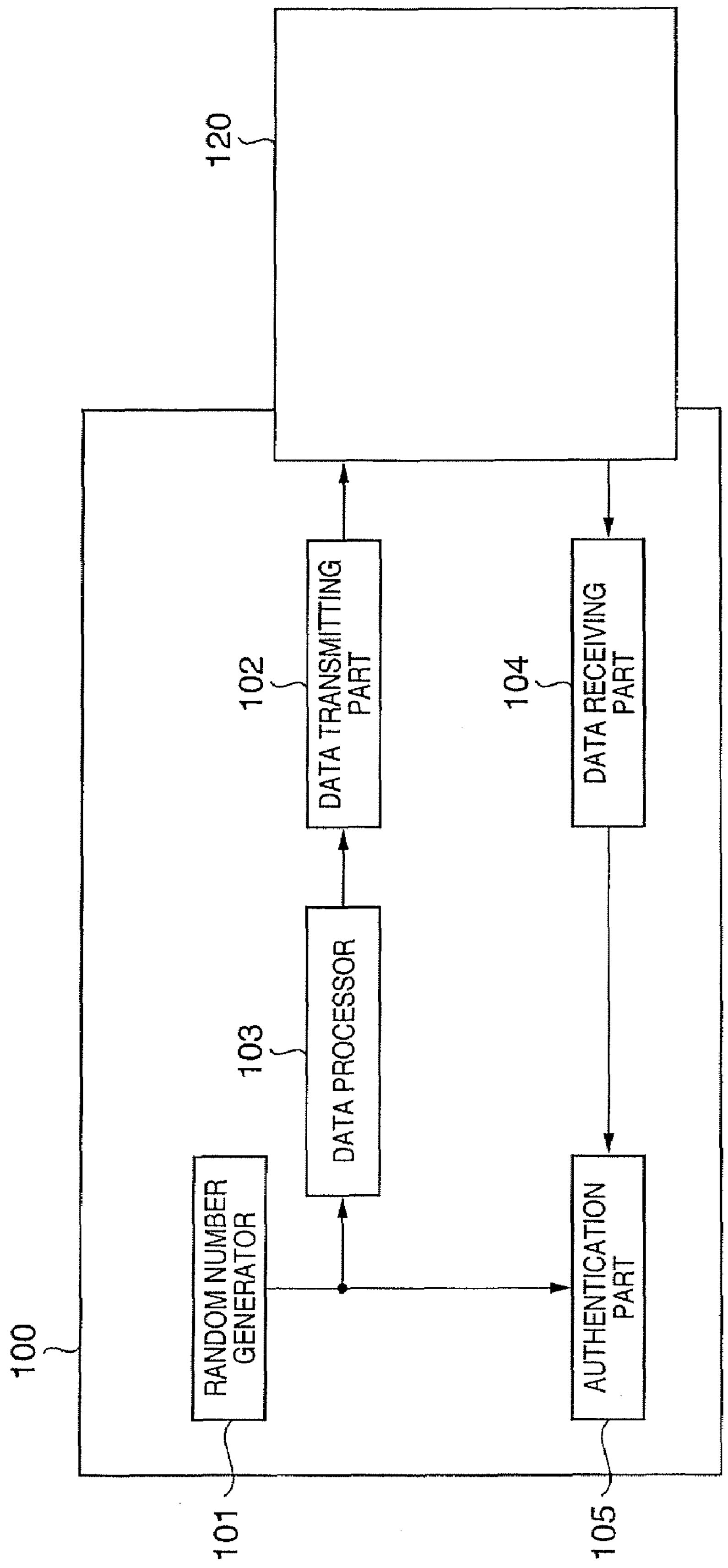
FIG. 11 is a diagram illustrating an exemplary electronic system according to another embodiment of the present invention.

FIG. 11 is a diagram illustrating an exemplary electronic system according to a second embodiment of the present invention. The second embodiment is a modification of the first embodiment. Accordingly, components similar to those described above are designated by like reference characters and need not be described again. The printer apparatus 100 of the first embodiment transmits a generated random number without encrypting the random number. Further, the unit 120 of the first embodiment encrypts a received random number and then transmits the encrypted signal to the printer apparatus 100.

The printer apparatus 100 according to the second embodiment, on the other hand, transmits an encrypted random number of the unit 120. Further, the unit 120 according to the second embodiment decrypts an encrypted random number and then transmits the decrypted signal to the printer apparatus 100. First, the data transmitting part 102 generates and transmits divided data based upon a random number (encrypted data) encrypted by the data processor 103.

On the other hand, the data processor 202 of the unit 120 decrypts the original random number from the encrypted data extracted by the error sensor 402. The data processor 202 of the unit 120 described above executes encryption processing in a manner similar to that of the data processor 103 of the printer apparatus 100. The second embodiment differs, however, in that the data processor 202 executes decryption processing. The data transmitting part 203 thenceforth generates divided data from the random number and transmits the divided data to the printer apparatus 100.

The data receiving part 104 extracts the random number the divided data received. The authentication part 105 subsequently compares the random number from the random number generator 101 and the random number from the data receiving part 104. Whether or not the unit 120 is a genuine product can be discriminated based upon the comparison.

Effects similar to those of the first embodiment are obtained in the second embodiment as well, as described above. That is, the unit 120 that has received a packet is capable of detecting burst error in ideal fashion by the termination identifier 805. As a result, it is possible to suppress genuine-unit authentication error that is based upon burst error.

Other Embodiments

In the foregoing embodiments, the printer apparatus 100 and the unit 120 communicate wirelessly. According to the present invention, however, the printer apparatus 100 and unit 120 may communicate by wire (communicate through contact).

Figure 12:
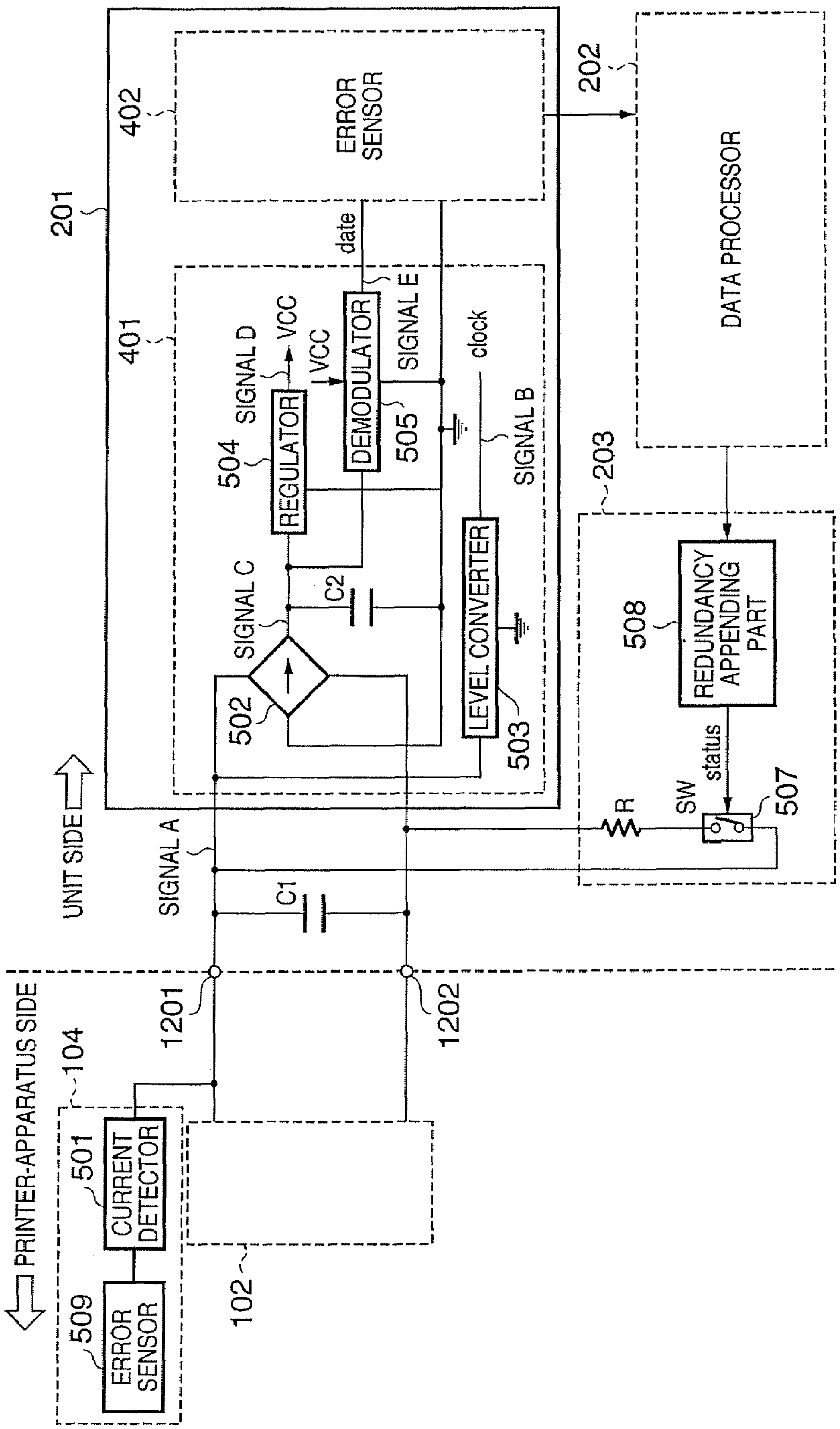
FIG. 12 is a diagram illustrating an exemplary electronic system according to another embodiment of the present invention.

FIG. 12 is a diagram illustrating an exemplary electronic system according to another embodiment of the present invention. In contrast with FIG. 5, two contacts 1201, 1202 are employed instead of the loop antennas 506, 516. That is, the printer apparatus 100 and unit 120 are capable of communicating by wire (by contact communication) via the contacts 1201, 1202.

By employing the two contacts 1201, 1202, the structure of the unit 120 at the connections thereof is simplified. This makes it easier to attach and detach the printer apparatus 100 and unit 120.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-344442, filed Nov. 29, 2005, which is hereby incorporated by reference herein in its entirety.

What is claimed is:

1. An electronic system comprising an electronic apparatus and a unit removably attached to said electronic apparatus, wherein said electronic apparatus includes:

a dividing part which divides data, which is to be transmitted, into fixed-length sub-data;

a generating part which generates a fixed-length packet by appending a termination identifier, which is for representing a termination point of the sub-data, to the sub-data;

a first transmitting part which transmits the generated packet to said unit;

a first receiving part which receives sub-data for authentication from said unit; and an authenticating part which authenticates said unit based upon the received sub-data and the sub-data that was included in the packet and transmitted; and said unit includes:

a second receiving part which receives the packet from said electronic apparatus;

a detecting part which executes a first data error detection based upon the termination identifier included in the received packet;

a data converting part which, if data error has not been detected by said detecting part, converts sub-data, which has been extracted from the received packet, to sub-data for authenticating said unit; and a second transmitting part which transmits sub-data for authenticating said unit to said electronic apparatus if data error has not been detected, and sends said electronic apparatus data for notifying of the fact that an error has occurred if data error has been detected.

2. The system according to claim 1, wherein said detecting part detects data-shift error or burst error as the first data error detection.

3. The system according to claim 1, wherein said generating part of said electronic apparatus generates a packet that includes redundancy data; and said detecting part of said unit executes second data error detection based upon the redundancy data included in the received packet.

4. The system according to claim 3, wherein said detecting part detects random error as the second data error detection.

5. The system according to claim 1, wherein said first transmitting part in said electronic apparatus transmits the packet together with a signal that is for supplying said unit with an operating clock.

6. The system according to claim 5, wherein said first transmitting part supplies said unit with the operating clock in a time period between processing for transmitting data from said electronic apparatus to said unit and processing for transmitting data from said unit to said electronic apparatus.

7. The system according to claim 5, wherein said second receiving part includes:

a register which holds received data; and an initializing part which initializes said register when an error has been detected in the signal for supplying the operating clock.

8. An authentication method for authenticating a unit removably attached an electronic apparatus, comprising the steps of:

in the electronic apparatus, dividing data, which is to be transmitted, into fixed-length sub-data;

in the electronic apparatus, generating a fixed-length packet by appending a termination identifier, which is for representing a termination point of the sub-data, to the sub-data;

in the electronic apparatus, transmitting the generated packet to the unit;

in the electronic apparatus, receiving sub-data for authentication from the unit;

in the unit, receiving the packet;

in the unit, executing a first data error detection based upon the termination identifier included in the received packet;

in the unit, if data error has not been detected, converting sub-data, which has been extracted from the received packet, to sub-data for authenticating the unit;

in the unit, transmitting sub-data for authenticating the unit to the electronic apparatus if data error has not been detected, and sending the electronic apparatus data for notifying of the fact that an error has occurred if data error has been detected;

in the electronic apparatus, receiving sub-data for authentication from the unit; and in the electronic apparatus, authenticating the unit based upon the received sub-data and the sub-data that was included in the packet and transmitted.

9. The method according to claim 8, wherein the packet includes redundancy data, and said detecting step includes a step of executing second data error detection based upon the redundancy data.

* * * * *